United States Patent
Li et al.

(10) Patent No.: US 8,934,353 B2
(45) Date of Patent: *Jan. 13, 2015

(54) METHODS AND APPARATUS FOR SCALING TRANSMIT POWER OF SIGNALS IN WIRELESS COMMUNICATIONS

(75) Inventors: Junyi Li, Chester, NJ (US); Saurabh Tavildar, Jersey City, NJ (US); Aleksandar Jovicic, Jersey City, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/575,942

(22) Filed: Oct. 8, 2009

(65) Prior Publication Data

US 2011/0086679 A1    Apr. 14, 2011

(51) Int. Cl.
    *H04W 52/04*    (2009.01)
    *H04W 52/50*    (2009.01)
    *H04W 52/24*    (2009.01)
    *H04W 52/38*    (2009.01)

(52) U.S. Cl.
    CPC ............ *H04W 52/50* (2013.01); *H04W 52/242* (2013.01); *H04W 52/38* (2013.01)
    USPC ......................... 370/252; 455/522; 455/127.1

(58) Field of Classification Search
    CPC ........................................ H04W 52/00–52/60
    USPC ......... 370/252, 253, 338, 437, 445, 447, 448, 370/462
    See application file for complete search history.

(56) References Cited

U.S. PATENT DOCUMENTS

| | | | |
|---|---|---|---|
| 6,973,039 B2 | 12/2005 | Redi et al. | |
| 7,535,877 B2 | 5/2009 | Wang | |
| 8,041,375 B2 | 10/2011 | Laroia et al. | |
| 8,072,957 B2 | 12/2011 | Gross et al. | |
| 8,140,103 B2 | 3/2012 | Wu et al. | |
| 2007/0211806 A1* | 9/2007 | Mudulodu et al. ............ | 375/260 |

(Continued)

FOREIGN PATENT DOCUMENTS

| | | |
|---|---|---|
| CN | 1774119 A | 5/2006 |
| CN | 1842216 A | 10/2006 |

(Continued)

OTHER PUBLICATIONS

Jeffrey P. Monks, et al.; "A Power Controlled Multiple Access Protocol for Wireless Packet Networks", IEEE INFOCOM 2001: 10 pages, 2001.
Alaa Muqattash et al.; "Power Controlled Dual Channel (PCDC) Medium Access Protocol for Wireless Ad Hoc Networks"; IEEE INFOCOM 2003; 11 pages; 2003.

(Continued)

*Primary Examiner* — Pao Sinkantarakorn
(74) *Attorney, Agent, or Firm* — James K. O'Hare

(57) ABSTRACT

Methods and apparatus of varying transmit power of signals for increasing system throughput and spectral reuse in an unlicensed spectrum are disclosed. One method includes transmitting from a first mobile device to a second mobile device a request to send (RTS) signal having a first transmit data power level based on a channel gain between the first mobile device and the second mobile device, receiving, at the first mobile device, a clear to send (CTS) signal from the second mobile device, and transmitting data at the first transmit data power level from the first mobile device to the second mobile device.

48 Claims, 8 Drawing Sheets

(56) References Cited

U.S. PATENT DOCUMENTS

| | | | |
|---|---|---|---|
| 2007/0280148 A1* | 12/2007 | Ding et al. | 370/318 |
| 2008/0102822 A1* | 5/2008 | Feng et al. | 455/425 |
| 2008/0166969 A1* | 7/2008 | Gorokhov et al. | 455/63.1 |
| 2008/0170512 A1* | 7/2008 | Hwang et al. | 370/255 |
| 2008/0293444 A1 | 11/2008 | Furuskar et al. | |
| 2009/0016271 A1 | 1/2009 | Li et al. | |
| 2009/0017850 A1* | 1/2009 | Jovicic et al. | 455/501 |
| 2009/0041151 A1* | 2/2009 | Khan et al. | 375/260 |
| 2009/0304096 A1 | 12/2009 | Khattab et al. | |
| 2011/0086664 A1 | 4/2011 | Li et al. | |

FOREIGN PATENT DOCUMENTS

| | | |
|---|---|---|
| JP | 2004533158 A | 10/2004 |
| JP | 2006295564 A | 10/2006 |
| JP | 2007166373 A | 6/2007 |
| WO | 02082751 A2 | 10/2002 |
| WO | WO2009009545 A2 | 1/2009 |

OTHER PUBLICATIONS

International Search Report and Written Opinion—PCT/US2010/051801, ISA/EPO—May 25, 2011.

\* cited by examiner

METHODS AND APPARATUS FOR SCALING TRANSMIT POWER OF SIGNALS IN WIRELESS COMMUNICATIONS

BACKGROUND

1. Field

The invention relates to wireless communications. More particularly, the invention relates to methods and apparatus for scaling transmit power of signals in wireless communications.

2. Background

Wireless communications continues to grow in demand and has become an integral part of both personal and business communications. Wireless communications allow users to transmit and receive data from most anywhere using wireless networks and wireless devices such as laptops, cellular devices, iPhones®, BlackBerrys®, etc.

Wireless fidelity (WiFi) describes the wireless networks that adhere to the specifications developed by the Institute of Electrical and Electronic Engineers (IEEE) for wireless local area networks (LAN). WiFi devices are certified to be interoperable with other certified WiFi devices using the 802.11 standard of the IEEE. These WiFi devices allow over-the-air interfaces in order to create a wireless network for facilitating data transfer.

WiFi uses carrier sense multiple access with collision avoidance (CSMA/CA) or request to send (RTS)/clear to send (CTS) signaling to perform distributed scheduling of peer-to-peer transmissions. For example, before a node transmits a signal, the node listens to the communications channel via CSMA to determine if the communications channel is available or unavailable. If the communications channel is available, the transmitting node transmits a RTS signal to a receiving node. Similarly, the receiving node transmits a CTS signal if it detects that the communications channel is available. If the communications channel is unavailable, the node waits to transmit until the communications channel is available. Hence, the transmission delays are increased with an increased number of nodes using the network.

In addition, the asynchronous nature of WiFi further impacts the latency and the power efficiency of the nodes. That is, transmissions and receptions using WiFi are not synchronized but rather are performed in an asynchronous manner. For example, a WiFi transmitter may try to communicate with a WiFi receiver at a random time and if the WiFi receiver is not ready to communicate at the random time or is surrounded by other WiFi transmitters trying to communicate with the WiFi receiver, the WiFi receiver is unable to receive the data correctly in which case the WiFi transmitter may decide to back-off and transmit at a later time (e.g., 10 milliseconds later). This example illustrates the inherent latencies in WiFi communications. Furthermore, power inefficiencies are also increased for the WiFi transmitter and the WiFi receiver.

Therefore, it has been recognized by those skilled in the art that a need exists for methods and apparatus for scaling transmit power of signals in wireless communications.

SUMMARY

Methods and apparatus of varying transmit power of signals for increasing system throughput and spectral reuse in an unlicensed spectrum are disclosed. One method includes transmitting from a first mobile device to a second mobile device a request to send (RTS) signal having a first transmit data power level based on a channel gain between the first mobile device and the second mobile device, receiving at the first mobile device a clear to send (CTS) signal from the second mobile device, and transmitting data at the first transmit data power level from the first mobile device to the second mobile device.

An apparatus for increasing system throughput in an unlicensed spectrum is disclosed. The apparatus includes a processor configured to transmit from a first mobile device to a second mobile device a first request to send (RTS) signal having a first transmit data power level based on a channel gain between the first mobile device and the second mobile device, receive, at the first mobile device, a first clear to send (CTS) signal from the second mobile device, and transmit data at the first transmit data power level from the first mobile device to the second mobile device.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods, apparatus, and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
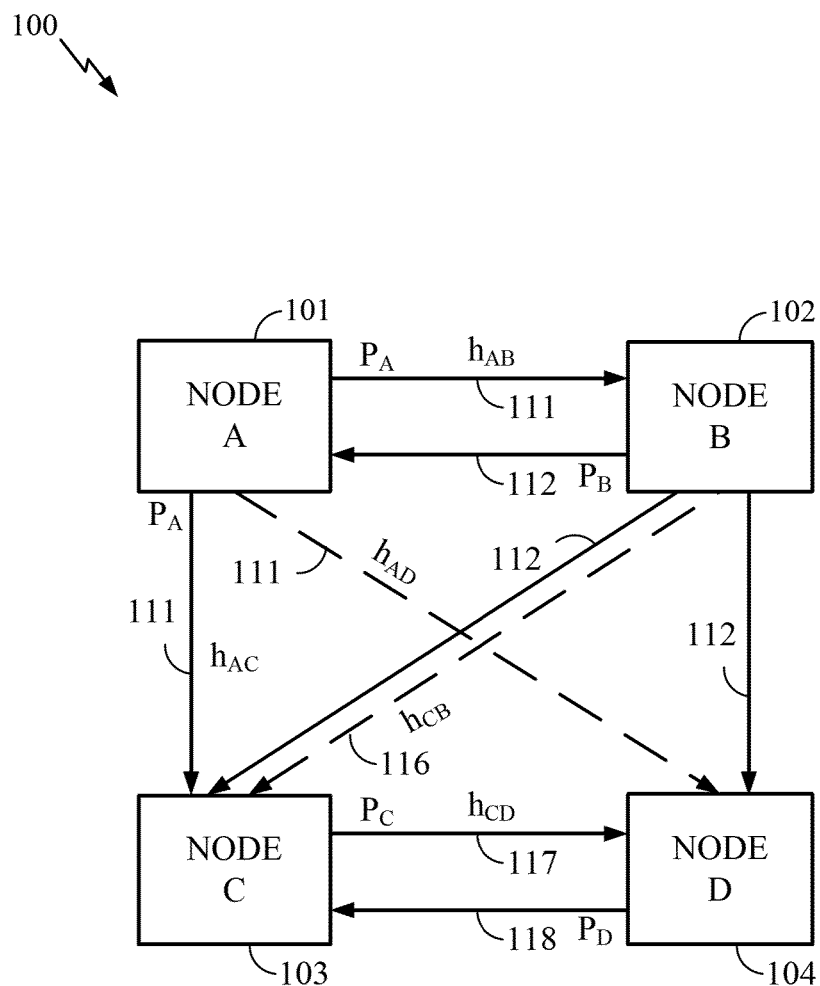
FIG. 1 is a simplified block diagram of a network having a plurality of nodes where each node can adjust the transmit power of its signals prior to transmission in accordance with various embodiments.

FIG. 1 is a simplified block diagram of a network 100 having a plurality of nodes 101, 102, 103 and 104 where each node can adjust the transmit power of its signals prior to transmission in accordance with various embodiments. The network 100 is configured to allow for increased throughput and spectral reuse in an unlicensed spectrum. In various embodiments, the network 100 can include one or more networks such as a WiFi network, an unlicensed network (i.e., a network operating in the unlicensed spectrum), a licensed network (i.e., a network operating in the licensed spectrum) and/or a carrier sense multiple access with collision avoidance (CSMA/CA) network, and each of the plurality of nodes 101, 102, 103 and 104 can be a WiFi device or node, a mobile device or a wireless communications device configured to operate in the licensed spectrum and/or the unlicensed spectrum, a user, or a white-space device (WSD) configured to operate in the licensed spectrum and/or the unlicensed spectrum. A WSD can be a mobile device, a laptop computer or other portable device operating in open or unused frequencies. For illustrative purposes, the disclosure will discuss WiFi networks and nodes operating in the unlicensed spectrum; however, other types of licensed and unlicensed networks and nodes are within the scope of the invention. Furthermore, even though four nodes 101, 102, 103 and 104 are shown in FIG. 1, the network 100 can include one or more nodes. For illustrative purposes, nodes 101, 102, 103 and 104 will also be referred to as node A, node B, node C and node D, respectively.

Figure 2:
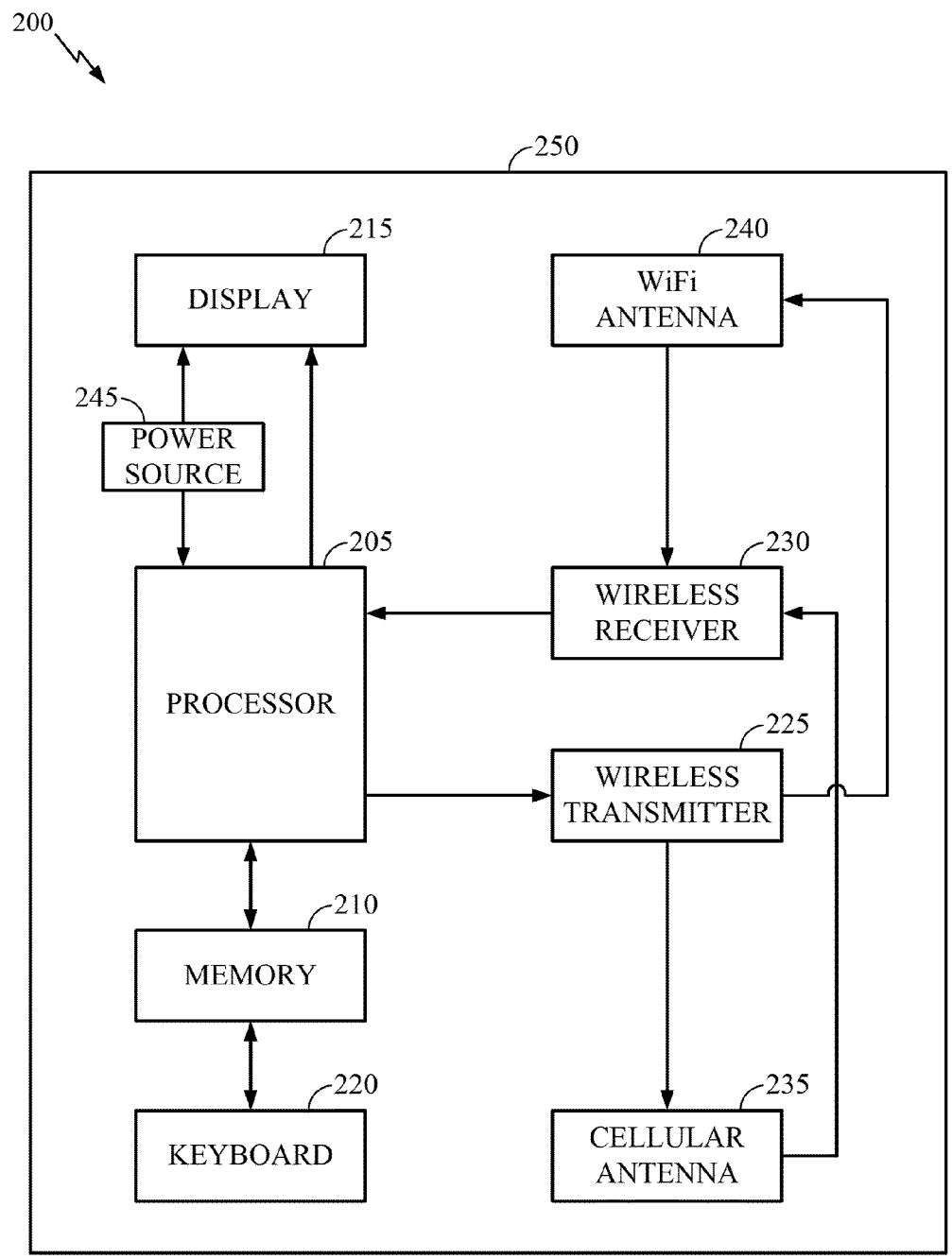
FIG. 2 is a block diagram of an exemplary node configured to determine a received power level of incoming signals or a channel gain of a channel between various nodes and to adjust the transmit power level of outgoing signals based on a function or variable (e.g., the received power level or the channel gain) in accordance with various embodiments.

FIG. 2 is a block diagram of an exemplary node configured to determine a received power level of incoming signals or a channel gain of a channel between various nodes and to adjust the transmit power level of outgoing signals based on a function or variable (e.g., the received power level or the channel gain) in accordance with various embodiments. For illustrative purposes, the term "node" will refer to a wireless communications device 200. The wireless communications device 200 is configured to receive and transmit signals and data in or using the licensed spectrum and/or the unlicensed spectrum. The wireless communications device 200 includes a processor 205, a memory 210, a display 215, a keyboard 220, a wireless transmitter 225, a wireless receiver 230, a first antenna 235, a second antenna 240, and a power source 245 (e.g., a battery). The chips, components or modules may be attached or formed on a printed circuit board 250. The printed circuit board 250 can refer to any dielectric substrate, ceramic substrate, or other circuit carrying structure for carrying signal circuits and electronic components within the wireless communications device 200.

The processor 205 may be implemented using hardware, software, firmware, middleware, microcode, or any combination thereof. The processor 205 may be an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure. The display 215 may be a LCD, LED or plasma display screen and the keyboard 220 may be a standard keyboard (e.g., a QWERTY layout) having letters and numbers.

The wireless transmitter 225 is coupled to the processor 205 and is used to encode and format the data for transmission via the first antenna 235 and/or the second antenna 240. The wireless transmitter 225 includes chips, circuitry and/or software that are used to adjust the transmit power (i.e., power scaling) of the data and/or signals that are received from the processor 205 and prior to being sent to the first antenna 235 and/or the second antenna 240 for transmission over a channel. The wireless transmitter 225 may use information (e.g., a channel gain) received from other channels or nodes via the first antenna 235, the second antenna 240, and/or the processor 205 to determine how to adjust or scale the transmit power of the data and/or signals.

The wireless receiver 230 is coupled to the processor 205 and is used to decode and parse the data after being received from the first antenna 235 and/or the second antenna 240. The wireless receiver 230 includes chips, circuitry and/or software that are used to receive information (e.g., a channel gain, power level, signals, etc.) from other channels or nodes via the first antenna 235 and/or the second antenna 240. The information is sent to the processor 205 for calculation and use by the processor 205 to determine how to adjust the transmit power of the data and/or signals that are to be transmitted to another node via the first antenna 235 and/or the second antenna 240.

The first antenna 235 may be positioned at a lower right portion of the wireless communications device 200 and the second antenna 240 may be positioned at an upper right portion of the wireless communications device 200. The first antenna 235 may be a cellular antenna, a GSM antenna, a CDMA antenna, a WCDMA antenna, or any other antenna capable of operating using the licensed spectrum. The second antenna 240 may be a WiFi antenna, a GPS antenna, or any other antenna capable of operating using the unlicensed spectrum. The power source 245 supplies power to the components or modules shown in FIG. 2. For illustrative purposes, each node A, B, C and D shown in FIG. 1 is a wireless communications device 200 as shown in FIG. 2.

Figure 3:
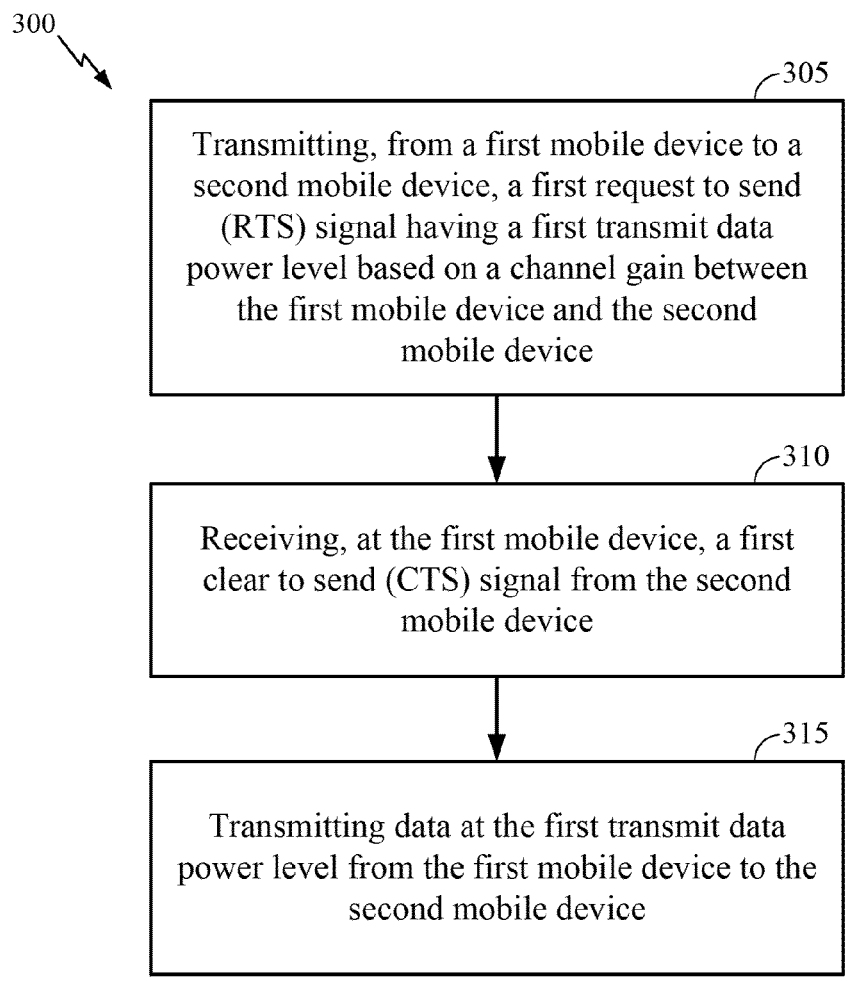
FIG. 3 is a flow diagram illustrating a method of increasing system throughput of a network with nodes operating in the unlicensed spectrum in accordance with various embodiments.
Figure 4:
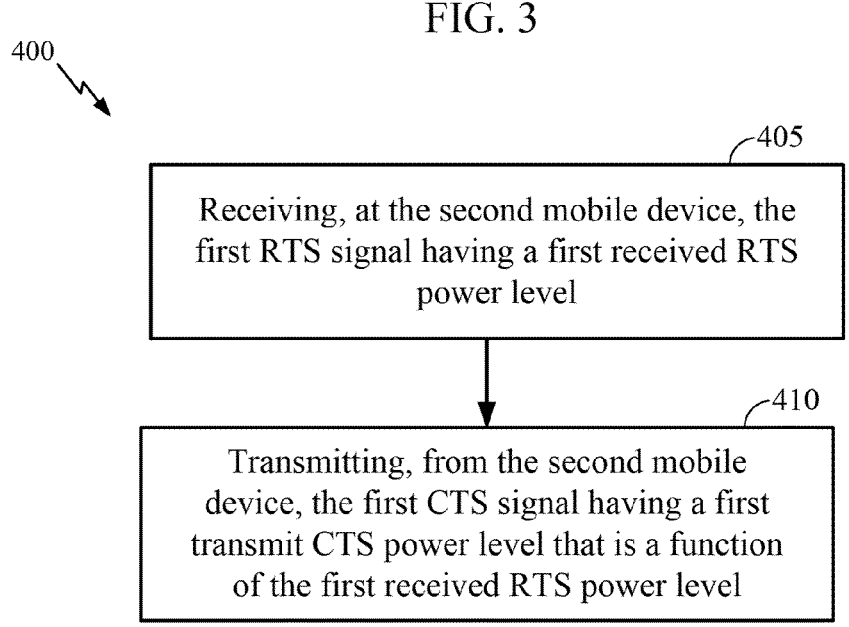
FIG. 4 is a flow diagram illustrating a method of increasing system throughput of a network with nodes operating in the unlicensed spectrum in accordance with various embodiments.

FIGS. 3 and 4 are flow diagrams illustrating methods 300 and 400, respectively, of increasing system throughput of a network 100 with nodes operating in the unlicensed spectrum in accordance with various embodiments. Referring to FIGS. 1-4, the method 300 is from the perspective of node A (e.g., a first wireless communications device) and the method 400 is from the perspective of node B (e.g., a second wireless communications device). In this embodiment, we assume that node A has prior knowledge of a channel gain ($h_{AB}$) between node A and node B. For example, the channel gain may be determined from a prior signal transmitted from node B to node A. Node A may store the channel gain in its memory 210. If node A has information about the channel gain prior to transmitting its RTS signal 111, node A can set the transmit power level of its RTS signal 111 based on the channel gain between node A and node B to $$P_A = \frac{1}{\sqrt{h_{AB}}}.$$

Prior to transmission by node A, the processor 205 and/or the wireless transmitter 225 of node A adjust or set a transmit data power level of the RTS signal 111 to be based on the channel gain ($h_{AB}$) between node A and node B (block 305). The channel gain ($h_{AB}$) is inversely proportional to the distance (d) between node A and ode B. That is, $$h_{AB}^2 \cong \frac{1}{d^\alpha},$$

where α is approximately 2.0 in free space and is approximately 3.5 in areas where some reflections are present. Hence, the larger the distance, the smaller the channel gain. In one embodiment, an estimate of the channel gain can be obtained from an in-band signal such as a service set identifier (SSID) broadcast or an out-of-band channel over which the nodes can perform peer discovery. The processor 205 and/or the wireless transmitter 225 of node A may receive an estimate of the channel gain prior to adjusting or setting the transmit data power level of the RTS signal 111. In one embodiment, the transmit data power level is inversely proportional to $$\left(\frac{1}{h_{AB}}\right)$$

or monotonically decreasing with the channel gain between node A and node B. The transmit data power level of the RTS signal 111 may be varied to allow more efficient use or time sharing of the channel (i.e., to facilitate concurrent transmissions of signals and/or data on the channel). Similarly, the transmit power level of the CTS signal 112 may be varied to allow more efficient use or time sharing of the channel.

Node A creates a RTS signal 111 or retrieves a RTS signal 111 from its memory 210 and transmits, using the wireless transmitter 225 and the second antenna 240, the RTS signal 111 to node B. The RTS signal 111 may have a transmit data power level based on the channel gain between node A and node B (described above). Node B receives the RTS signal 111 such that the RTS signal 111 has a first received RTS power level (block 405). After receipt of the RTS signal 111, node B transmits a CTS signal 112 having a first transmit CTS power level that is a function of the first received RTS power level (block 410). The function can be that the first transmit CTS power level is inversely proportional to the first received RTS power level, $$CTS_P = \left(\frac{1}{RTS_P}\right),$$

or the first transmit CTS power level is monotonically decreasing with the first received RTS power level. The RTS signal 111 and/or the CTS signal 112 may each include a packet duration.

Node A receives the CTS signal 112 from node B using the second antenna 240 and the wireless receiver 230 (block 310). Node A adjusts or sets the transmit data power level for the data using the processor 205 and/or the wireless transmitter 225 and transmits the data via the second antenna 240 to node B (block 315). In one embodiment, the data is transmitted at a transmit data power level that is based on the channel gain ($h_{AB}$) between node A and node B (described above).

Figure 5:
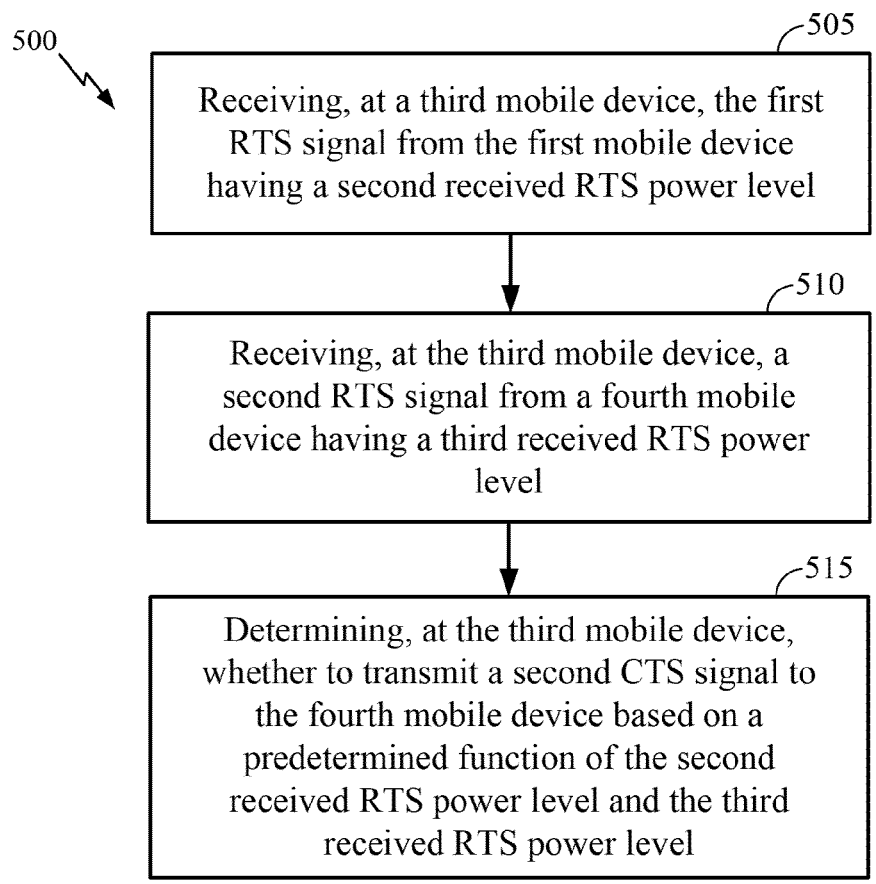
FIG. 5 is a flow diagram illustrating a method of increasing system throughput of a network with nodes operating in the unlicensed spectrum in accordance with various embodiments.
Figure 6:
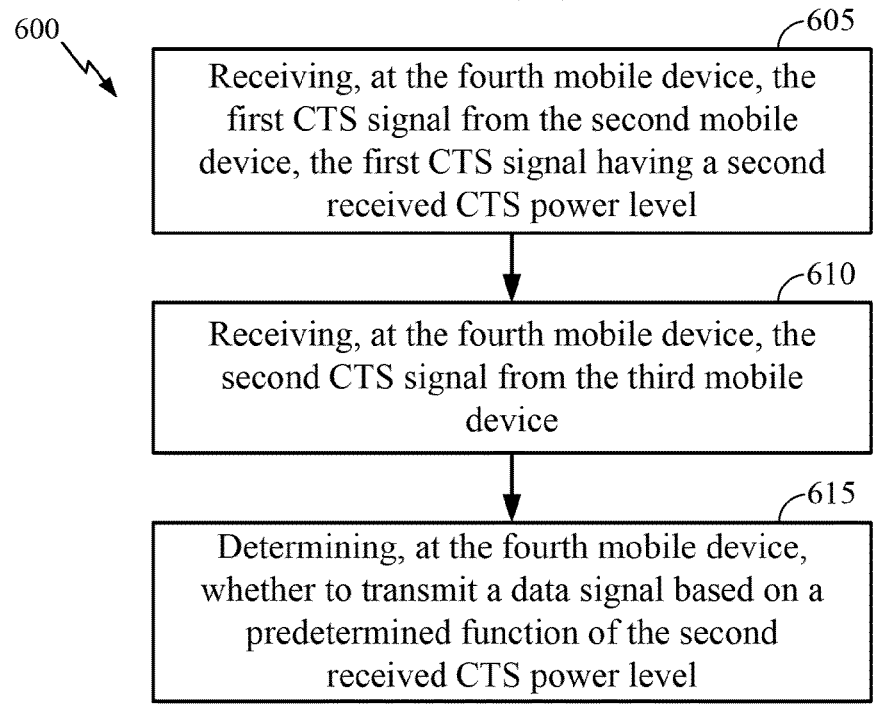
FIG. 6 is a flow diagram illustrating a method of increasing system throughput of a network with nodes operating in the unlicensed spectrum in accordance with various embodiments.

FIGS. 5 and 6 are flow diagrams illustrating methods 500 and 600, respectively, of increasing system throughput of a network 100 with nodes operating in the unlicensed spectrum in accordance with various embodiments. The method 500 is from the perspective of node C and the method 500 is from the perspective of node D.

Referring to FIGS. 1, 2, 5 and 6, node A would like to transmit a RTS signal 111 to node B and node D would like to transmit a RTS signal 118 to node C at approximately the same time. Node A transmits the RTS signal 111 to node B where the RTS signal 111 has a fixed power $P_f$. Node B receives the RTS signal 111 at a first received RTS power level (which is a function of the fixed power $P_f$) and transmits a CTS signal 112 to node A where the CTS signal 112 has a first transmit CTS power level that is a function of the first received RTS power level $$\left(\text{e.g., power } P_B = \right.$$
$$\left. 1/(\text{received power level of node A's RTS signal}) \text{ or } P_B \cong \frac{1}{h_{AB}^2 * P_f}\right)$$

(blocks 405 and 410). The function is inversely proportional to the first received RTS power level or monotonically decreasing with the first received RTS power level.

Node C may receive or sense the RTS signal 111 having a second received RTS power level (from node A) and the RTS signal 118 having a third received RTS power level (from node D) (blocks 505 and 510). Node C receives or senses the RTS signal 118 using the second antenna 240 and the wireless receiver 230. If node C senses the RTS signal 111 from node A and the RTS signal 118 from node D, node C is inclined to back off and not send its CTS signal 117 to node D. However, due to the reduced transmit power of the transmit signal(s) (e.g., the RTS signal 111 and/or the RTS signal 118), node C may be able to transmit a second CTS signal 117 to node D. Node C determines whether to transmit the second CTS signal 117 to node D based on a predetermined function of the second received RTS power level and the third received RTS power level (block 515). As an example, node C will transmit the second CTS signal 117 to node D if the third received RTS power level is greater than the second received RTS power level. This indicates that the RTS signal 118 from node D is stronger than the RTS signal 111 from node A. As another example, node C will transmit the second CTS signal 117 to node D if the ratio of the second received RTS power level and the third received RTS power level is greater than or less than a predetermined threshold (e.g., 0.10, 0.25, 0.5, 0.75, 1, 2, 5, 10). Using the processor 205, node C transmits the second CTS signal 117 to node D using the wireless transmitter 225 and the second antenna 240. Even though node C hears the RTS signal 111 from node A, the RTS signal 111 is so weak that it is alright for node C to transmit the CTS signal 117 to node D.

Node D make a similar determination as node C as to whether the first CTS signal 112 from node B is weak enough that it is alright to transmit the data to node C. Node D receives the first CTS signal 112 having a second received CTS power level from node B (block 605). Node D also receives a second CTS signal 117 from node C (block 610). Node D determines whether to transmit a data signal to node C based on a predetermined function of the second received CTS power level (block 615). The predetermined function compares the product of the second received CTS power level and a second transmit data power level to a predetermined threshold (e.g., 0.10, 0.25, 0.5, 0.75, 1, 2, 5, 10). The second transmit data power level is used by node D for adjusting or setting the second RTS signal 118 or a data signal of node D for transmission to node C. The second transmit data power level is inversely proportional to or monotonically decreasing with a channel gain between node C and node D. The channel gain may be determined from a prior signal transmitted from node C to node D.

In certain situations, nodes A and B will have reduced transmit power levels for their respective RTS and CTS signals which will allow other nodes (e.g., nodes C and D) to have efficient reuse or concurrent reuse of the channel. That is, nodes C and D can transmit without interfering with the transmissions on the same channel by nodes A and B due to power scaling of the transmit signals. All nodes in the network 100 can adjust or set their transmit data power levels for their transmit signals to achieve power scaling and allow efficient reuse of the channels in the network.

Figure 7:
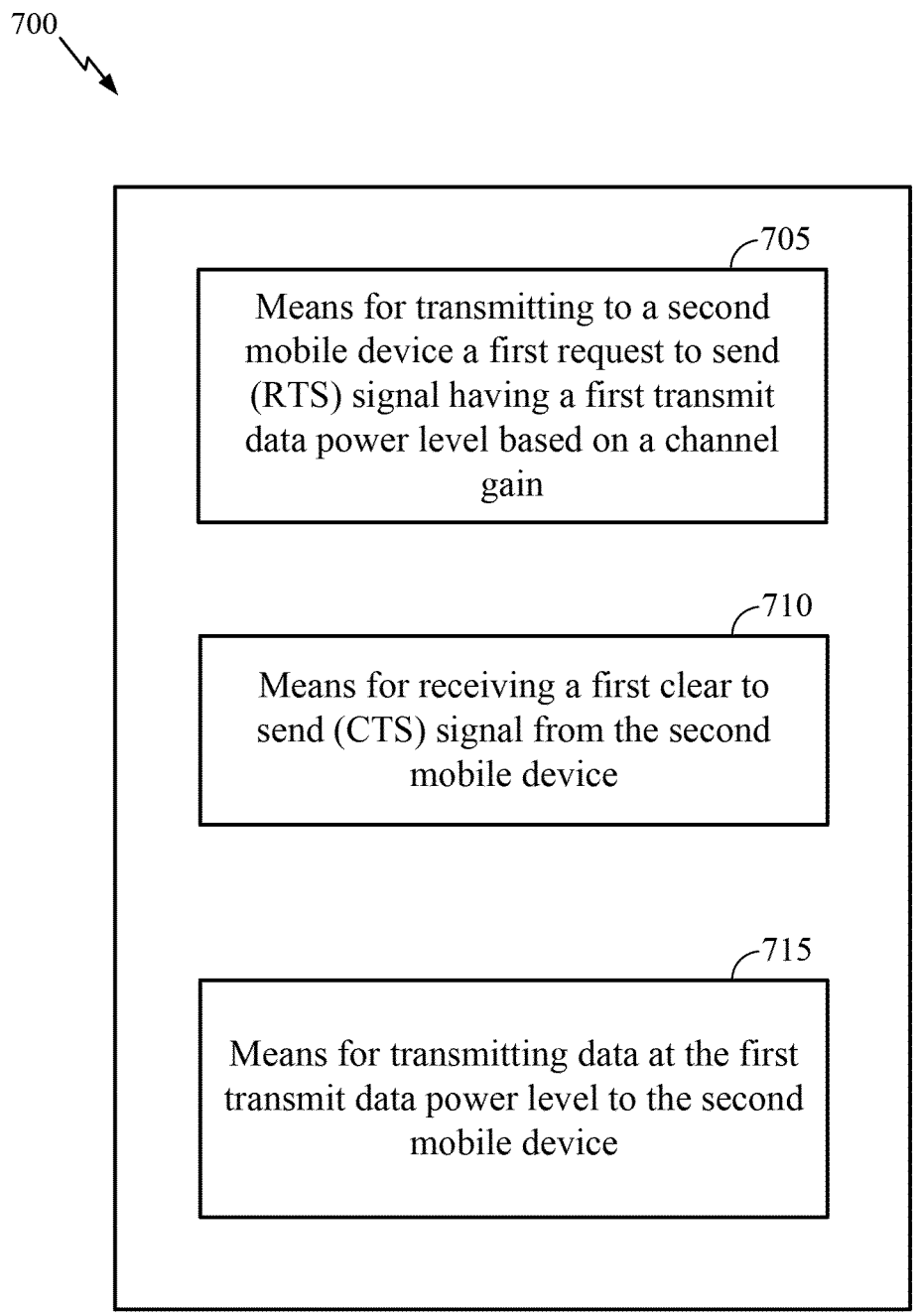
FIG. 7 is a block diagram illustrating exemplary components for the apparatus and the means for apparatus for increasing system throughput and spectral reuse in an unlicensed spectrum in accordance with various embodiments.

FIG. 7 is a block diagram illustrating exemplary components for the apparatus and the means for apparatus for increasing system throughput and spectral reuse with nodes operating in the unlicensed spectrum in accordance with various embodiments. The apparatus 700 may include a module 705 for transmitting from a first mobile device 101 to a second mobile device 102 a first RTS signal 111 having a first transmit data power level based on a channel gain between the first mobile device 101 and the second mobile device 102, a module 710 for receiving at the first mobile device 101 a CTS signal 112 from the second mobile device 102, and a module 715 for transmitting data at the first transmit data power level from the first mobile device 101 to the second mobile device 102.

Figure 8:
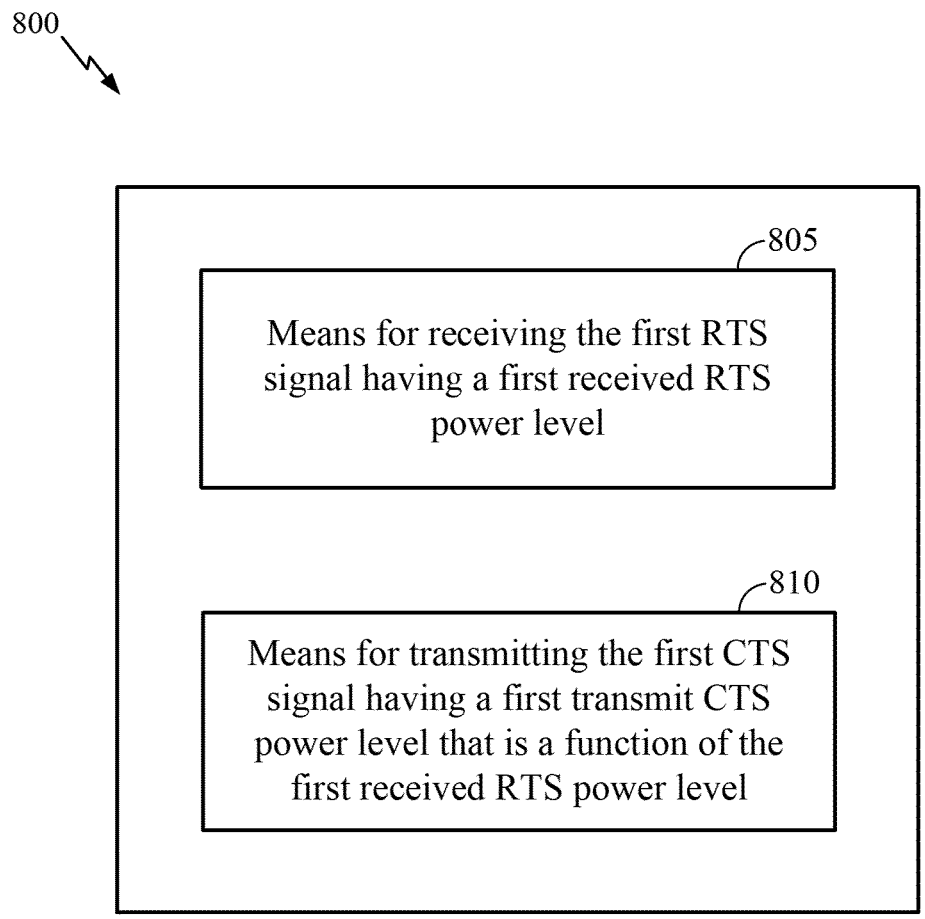
FIG. 8 is a block diagram illustrating exemplary components for the apparatus and the means for apparatus for increasing system throughput and spectral reuse in an unlicensed spectrum in accordance with various embodiments.

FIG. 8 is a block diagram illustrating exemplary components for the apparatus and the means for apparatus for increasing system throughput and spectral reuse with nodes operating in the unlicensed spectrum in accordance with various embodiments. The apparatus 800 may include a module 805 for receiving, at the second mobile device 102, the first RTS signal 111 having a first received RTS power level, and a module 810 for transmitting, from the second mobile device 102, the first CTS signal having a first transmit CTS power level that is a function of the first received RTS power level.

Figure 9:
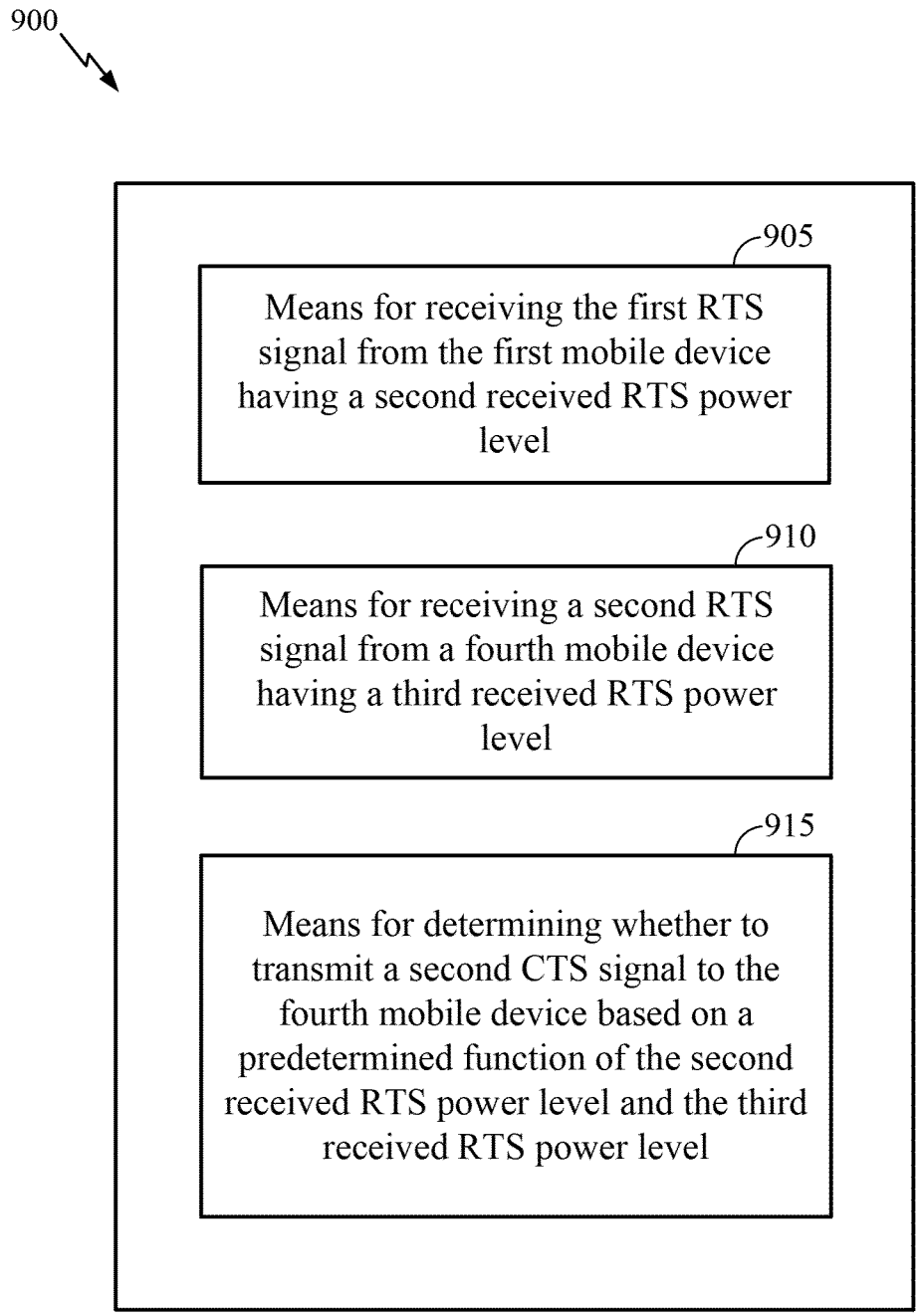
FIG. 9 is a block diagram illustrating exemplary components for the apparatus and the means for apparatus for increasing system throughput and spectral reuse in an unlicensed spectrum in accordance with various embodiments.

FIG. 9 is a block diagram illustrating exemplary components for the apparatus and the means for apparatus for increasing system throughput and spectral reuse with nodes operating in the unlicensed spectrum in accordance with various embodiments. The apparatus 900 may include a module 905 for receiving the first RTS signal from the first mobile device 101 having a second received RTS power level, a module 910 for receiving at the third mobile device 103 a second RTS 118 from a fourth mobile device 104 having a third received RTS power level, and a module 915 for determining whether to transmit a second CTS signal to the fourth mobile device 104 based on a predetermined function of the second received RTS power level and the third received power level.

Figure 10:
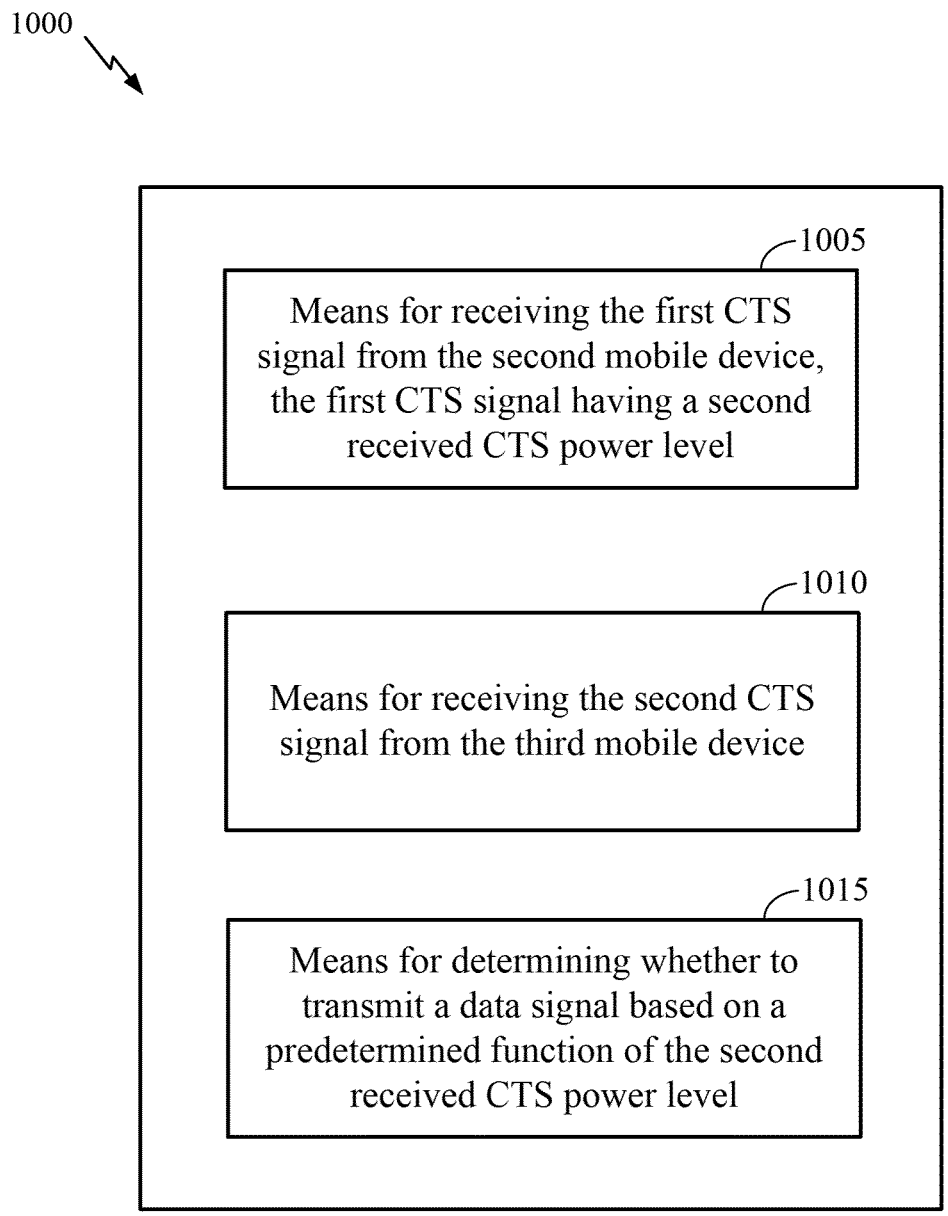
FIG. 10 is a block diagram illustrating exemplary components for the apparatus and the means for apparatus for increasing system throughput and spectral reuse in an unlicensed spectrum in accordance with various embodiments.

FIG. 10 is a block diagram illustrating exemplary components for the apparatus and the means for apparatus for increasing system throughput and spectral reuse with nodes operating in the unlicensed spectrum in accordance with various embodiments. The apparatus 1000 may include a module 1005 for receiving, at the fourth mobile device 104, the first CTS signal 112 from the second mobile device 102, the first CTS signal 112 having a second received CTS power level, a module 1010 for receiving the second CTS signal 117 from the third mobile device 103, and a module 1015 for determining whether to transmit a data signal based on a predetermined function of the second received CTS power level.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of increasing system throughput in an unlicensed spectrum comprising:
    receiving a service set identifier (SSID) broadcast;
    estimating an actual channel gain between a first mobile device and a second mobile device based on the SSID broadcast;
    transmitting from the first mobile device to the second mobile device a first request to send (RTS) signal having a first transmit data power level based on the actual channel gain between the first mobile device and the second mobile device;
    receiving, at the first mobile device, a first clear to send (CTS) signal from the second mobile device; and
    transmitting data at the first transmit data power level from the first mobile device to the second mobile device,
    wherein the actual channel gain is inversely proportional to a distance between the first mobile device and the second mobile device.

2. The method of claim 1 wherein the first transmit data power level is inversely proportional to or monotonically decreasing with the actual channel gain between the first mobile device and the second mobile device.

3. The method of claim 1 wherein:
    the second mobile device receives the first RTS signal having a first received RTS power level; and
    the second mobile device transmits the first CTS signal having a first transmit CTS power level that is a function of the first received RTS power level.

4. The method of claim 3 wherein the first transmit CTS power level is inversely proportional to the first received RTS power level or the first transmit CTS power level is monotonically decreasing with the first received RTS power level.

5. The method of claim 1 further comprising:
    receiving, at a third mobile device, the first RTS signal from the first mobile device having a second received RTS power level;
    receiving, at the third mobile device, a second RTS signal from a fourth mobile device having a third received RTS power level; and
    determining, at the third mobile device, whether to transmit a second CTS signal to the fourth mobile device based on a predetermined function of the second received RTS power level and the third received RTS power level.

6. The method of claim 5 wherein the predetermined function compares the ratio of the second received RTS power level and the third received RTS power level to a predetermined threshold.

7. A method of increasing system throughput in an unlicensed spectrum comprising:
    receiving a service set identifier (SSID) broadcast;
    estimating a channel gain between a first mobile device and a second mobile device based on the SSID broadcast;
    transmitting from the first mobile device to the second mobile device a first request to send (RTS) signal having a first transmit data power level based on the channel gain between the first mobile device and the second mobile device;
    receiving, at the first mobile device, a first clear to send (CTS) signal from the second mobile device;
    transmitting data at the first transmit data power level from the first mobile device to the second mobile device,
    wherein the channel gain is inversely proportional to a distance between the first mobile device and the second mobile device;
    receiving, at a third mobile device, the first RTS signal from the first mobile device having a second received RTS power level;
    receiving, at the third mobile device, a second RTS signal from a fourth mobile device having a third received RTS power level;
    determining, at the third mobile device, whether to transmit a second CTS signal to the fourth mobile device based on a first predetermined function of the second received RTS power level and the third received RTS power level;
    receiving, at the fourth mobile device, the first CTS signal from the second mobile device, the first CTS signal having a second received CTS power level;
    receiving, at the fourth mobile device, the second CTS signal from the third mobile device; and
    determining, at the fourth mobile device, whether to transmit a data signal based on a second predetermined function of the second received CTS power level.

8. The method of claim 7 wherein the second predetermined function compares the product of the second received CTS power level and a second transmit data power level to a predetermined threshold.

9. The method of claim 8 wherein the second transmit data power level is to be used by the fourth mobile device to transmit a second RTS signal to the third mobile device or a data signal to the third mobile device.

10. The method of claim 9 wherein the second transmit data power level is inversely proportional to or monotonically decreasing with a channel gain between the third mobile device and the fourth mobile device.

11. The method of claim 10 wherein the channel gain is determined from a prior signal transmitted from the third mobile device to the fourth mobile device.

12. An apparatus for increasing system throughput in an unlicensed spectrum comprising:
    a processor configured to:
    receive a service set identifier (SSID) broadcast;
    estimate an actual channel gain between a first mobile device and a second mobile device based on the SSID broadcast;
    transmit from the first mobile device to the second mobile device a first request to send (RTS) signal having a first transmit data power level based on the actual channel gain between the first mobile device and the second mobile device;
    receive, at the first mobile device, a first clear to send (CTS) signal from the second mobile device; and
    transmit data at the first transmit data power level from the first mobile device to the second mobile device, wherein the actual channel gain is inversely proportional to a distance between the first mobile device and the second mobile device.

13. The apparatus of claim 12 wherein the first transmit data power level is inversely proportional to or monotonically decreasing with the actual channel gain between the first mobile device and the second mobile device.

14. The apparatus of claim 12 wherein:
the second mobile device receives the first RTS signal having a first received RTS power level; and
the second mobile device transmits the first CTS signal having a first transmit CTS power level that is a function of the first received RTS power level.

15. The apparatus of claim 14 wherein the first transmit CTS power level is inversely proportional to the first received RTS power level or the first transmit CTS power level is monotonically decreasing with the first received RTS power level.

16. The apparatus of claim 12 wherein the processor is further configured to:
receive, at a third mobile device, the first RTS signal from the first mobile device having a second received RTS power level;
receive, at the third mobile device, a second RTS signal from a fourth mobile device having a third received RTS power level; and
determine, at the third mobile device, whether to transmit a second CTS signal to the fourth mobile device based on a predetermined function of the second received RTS power level and the third received RTS power level.

17. The apparatus of claim 16 wherein the predetermined function compares the ratio of the second received RTS power level and the third received RTS power level to a predetermined threshold.

18. An apparatus for increasing system throughput in an unlicensed spectrum comprising:
a processor configured to:
receive a service set identifier (SSID) broadcast;
estimate a channel gain between a first mobile device and a second mobile device based on the SSID broadcast;
transmit from the first mobile device to the second mobile device a first request to send (RTS) signal having a first transmit data power level based on the channel gain between the first mobile device and the second mobile device;
receive, at the first mobile device, a first clear to send (CTS) signal from the second mobile device;
transmit data at the first transmit data power level from the first mobile device to the second mobile device,
wherein the channel gain is inversely proportional to a distance between the first mobile device and the second mobile device;
receive, at a third mobile device, the first RTS signal from the first mobile device having a second received RTS power level;
receive, at the third mobile device, a second RTS signal from a fourth mobile device having a third received RTS power level;
determine, at the third mobile device, whether to transmit a second CTS signal to the fourth mobile device based on a first predetermined function of the second received RTS power level and the third received RTS power level;
receive, at the fourth mobile device, the first CTS signal from the second mobile device, the first CTS signal having a second received CTS power level;
receive, at the fourth mobile device, the second CTS signal from the third mobile device; and
determine, at the fourth mobile device, whether to transmit a data signal based on a second predetermined function of the second received CTS power level.

19. The apparatus of claim 18 wherein the second predetermined function compares the product of the second received CTS power level and a second transmit data power level to a predetermined threshold.

20. The apparatus of claim 19 wherein the second transmit data power level is to be used by the fourth mobile device to transmit a second RTS signal to the third mobile device or a data signal to the third mobile device.

21. The apparatus of claim 20 wherein the second transmit data power level is inversely proportional to or monotonically decreasing with a channel gain between the third mobile device and the fourth mobile device.

22. The apparatus of claim 21 wherein the channel gain is determined from a prior signal transmitted from the third mobile device to the fourth mobile device.

23. An apparatus for increasing system throughput in an unlicensed spectrum comprising:
means for receiving a service set identifier (SSID) broadcast;
means for estimating an actual channel gain between a first mobile device and a second mobile device based on the SSID broadcast;
means for transmitting from the first mobile device to the second mobile device a first request to send (RTS) signal having a first transmit data power level based on the actual channel gain between the first mobile device and the second mobile device;
means for receiving, at the first mobile device, a first clear to send (CTS) signal from the second mobile device; and
means for transmitting data at the first transmit data power level from the first mobile device to the second mobile device,
wherein the actual channel gain is inversely proportional to a distance between the first mobile device and the second mobile device.

24. The apparatus of claim 23 wherein the first transmit data power level is inversely proportional to or monotonically decreasing with the actual channel gain between the first mobile device and the second mobile device.

25. The apparatus of claim 23 wherein:
the second mobile device receives the first RTS signal having a first received RTS power level; and
the second mobile device transmits the first CTS signal having a first transmit CTS power level that is a function of the first received RTS power level.

26. The apparatus of claim 25 wherein the first transmit CTS power level is inversely proportional to the first received RTS power level or the first transmit CTS power level is monotonically decreasing with the first received RTS power level.

27. The apparatus of claim 23 further comprising:
means for receiving, at a third mobile device, the first RTS signal from the first mobile device having a second received RTS power level;
means for receiving, at the third mobile device, a second RTS signal from a fourth mobile device having a third received RTS power level; and
means for determining, at the third mobile device, whether to transmit a second CTS signal to the fourth mobile device based on a predetermined function of the second received RTS power level and the third received RTS power level.

28. The apparatus of claim 27 wherein the predetermined function compares the ratio of the second received RTS power level and the third received RTS power level to a predetermined threshold.

29. An apparatus for increasing system throughput in an unlicensed spectrum comprising:
- means for receiving a service set identifier (SSID) broadcast;
- means for estimating a channel gain between a first mobile device and a second mobile device based on the SSID broadcast;
- means for transmitting from the first mobile device to the second mobile device a first request to send (RTS) signal having a first transmit data power level based on the channel gain between the first mobile device and the second mobile device;
- means for receiving, at the first mobile device, a first clear to send (CTS) signal from the second mobile device;
- means for transmitting data at the first transmit data power level from the first mobile device to the second mobile device,
- wherein the channel gain is inversely proportional to a distance between the first mobile device and the second mobile device;
- means for receiving, at a third mobile device, the first RTS signal from the first mobile device having a second received RTS power level;
- means for receiving, at the third mobile device, a second RTS signal from a fourth mobile device having a third received RTS power level;
- means for determining, at the third mobile device, whether to transmit a second CTS signal to the fourth mobile device based on a first predetermined function of the second received RTS power level and the third received RTS power level;
- means for receiving, at the fourth mobile device, the first CTS signal from the second mobile device, the first CTS signal having a second received CTS power level;
- means for receiving, at the fourth mobile device, the second CTS signal from the third mobile device; and
- means for determining, at the fourth mobile device, whether to transmit a data signal based on a second predetermined function of the second received CTS power level.

30. The apparatus of claim 29 wherein the second predetermined function compares the product of the second received CTS power level and a second transmit data power level to a predetermined threshold.

31. The apparatus of claim 30 wherein the second transmit data power level is to be used by the fourth mobile device to transmit a second RTS signal to the third mobile device or a data signal to the third mobile device.

32. The apparatus of claim 31 wherein the second transmit data power level is inversely proportional to or monotonically decreasing with a channel gain between the third mobile device and the fourth mobile device.

33. The apparatus of claim 32 wherein the channel gain is determined from a prior signal transmitted from the third mobile device to the fourth mobile device.

34. A non-transitory machine readable medium comprising:
- instructions for receiving a service set identifier (SSID) broadcast;
- instructions for estimating an actual channel gain between a first mobile device and a second mobile device based on the SSID broadcast;
- instructions for transmitting from the first mobile device to the second mobile device a first request to send (RTS) signal having a first transmit data power level based on the actual channel gain between the first mobile device and the second mobile device;
- instructions for receiving, at the first mobile device, a first clear to send (CTS) signal from the second mobile device; and
- instructions for transmitting data at the first transmit data power level from the first mobile device to the second mobile device,
- wherein the actual channel gain is inversely proportional to a distance between the first mobile device and the second mobile device.

35. The non-transitory machine readable medium of claim 34 wherein the first transmit data power level is inversely proportional to or monotonically decreasing with the actual channel gain between the first mobile device and the second mobile device.

36. The non-transitory machine readable medium of claim 34 wherein:
- the second mobile device receives the first RTS signal having a first received RTS power level; and
- the second mobile device transmits the first CTS signal having a first transmit CTS power level that is a function of the first received RTS power level.

37. The non-transitory machine readable medium of claim 36 wherein the first transmit CTS power level is inversely proportional to the first received RTS power level or the first transmit CTS power level is monotonically decreasing with the first received RTS power level.

38. The non-transitory machine readable medium of claim 34 further comprising:
- instructions for receiving, at a third mobile device, the first RTS signal from the first mobile device having a second received RTS power level;
- instructions for receiving, at the third mobile device, a second RTS signal from a fourth mobile device having a third received RTS power level; and
- instructions for determining, at the third mobile device, whether to transmit a second CTS signal to the fourth mobile device based on a predetermined function of the second received RTS power level and the third received RTS power level.

39. The non-transitory machine readable medium of claim 38 wherein the predetermined function compares the ratio of the second received RTS power level and the third received RTS power level to a predetermined threshold.

40. A non-transitory machine readable medium comprising:
- instructions for receiving a service set identifier (SSID) broadcast;
- instructions for estimating a channel gain between a first mobile device and a second mobile device based on the SSID broadcast;
- instructions for transmitting from the first mobile device to the second mobile device a first request to send (RTS) signal having a first transmit data power level based on the channel gain between the first mobile device and the second mobile device;
- instructions for receiving, at the first mobile device, a first clear to send (CTS) signal from the second mobile device;
- instructions for transmitting data at the first transmit data power level from the first mobile device to the second mobile device, wherein the channel gain is inversely proportional to a distance between the first mobile device and the second mobile device;
instructions for receiving, at a third mobile device, the first RTS signal from the first mobile device having a second received RTS power level;
instructions for receiving, at the third mobile device, a second RTS signal from a fourth mobile device having a third received RTS power level;
instructions for determining, at the third mobile device, whether to transmit a second CTS signal to the fourth mobile device based on a first predetermined function of the second received RTS power level and the third received RTS power level;
instructions for receiving, at the fourth mobile device, the first CTS signal from the second mobile device, the first CTS signal having a second received CTS power level;
instructions for receiving, at the fourth mobile device, the second CTS signal from the third mobile device; and
instructions for determining, at the fourth mobile device, whether to transmit a data signal based on a second predetermined function of the second received CTS power level.

41. The non-transitory machine readable medium of claim 40 wherein the second predetermined function compares the product of the second received CTS power level and a second transmit data power level to a predetermined threshold.

42. The non-transitory machine readable medium of claim 41 wherein the second transmit data power level is to be used by the fourth mobile device to transmit a second RTS signal to the third mobile device or a data signal to the third mobile device.

43. The non-transitory machine readable medium of claim 42 wherein the second transmit data power level is inversely proportional to or monotonically decreasing with a channel gain between the third mobile device and the fourth mobile device.

44. The non-transitory machine readable medium of claim 43 wherein the channel gain is determined from a prior signal transmitted from the third mobile device to the fourth mobile device.

45. A method of increasing system throughput in an unlicensed spectrum comprising:
receiving a service set identifier (SSID) broadcast;
estimating a channel gain between a first mobile device and a second mobile device based on the SSID broadcast;
transmitting from the first mobile device to the second mobile device a first request to send (RTS) signal having a first transmit data power level based on the channel gain between the first mobile device and the second mobile device, wherein the channel gain is inversely proportional to a distance between the first mobile device and the second mobile device;
receiving, at the first mobile device, a first clear to send (CTS) signal from the second mobile device;
transmitting data at the first transmit data power level from the first mobile device to the second mobile device;
receiving, at a third mobile device, the first RTS signal from the first mobile device having a second received RTS power level;
receiving, at the third mobile device, a second RTS signal from a fourth mobile device having a third received RTS power level; and
determining, at the third mobile device, whether to transmit a second CTS signal to the fourth mobile device based on a predetermined function of the second received RTS power level and the third received RTS power level,
wherein the predetermined function compares the ratio of the second received RTS power level and the third received RTS power level to a predetermined threshold.

46. An apparatus for increasing system throughput in an unlicensed spectrum comprising:
a processor configured to:
receive a service set identifier (SSID) broadcast;
estimate a channel gain between a first mobile device and a second mobile device based on the SSID broadcast;
transmit from the first mobile device to the second mobile device a first request to send (RTS) signal having a first transmit data power level based on the channel gain between the first mobile device and the second mobile device, wherein the channel gain is inversely proportional to a distance between the first mobile device and the second mobile device;
receive, at the first mobile device, a first clear to send (CTS) signal from the second mobile device;
transmit data at the first transmit data power level from the first mobile device to the second mobile device;
receive, at a third mobile device, the first RTS signal from the first mobile device having a second received RTS power level;
receive, at the third mobile device, a second RTS signal from a fourth mobile device having a third received RTS power level; and
determine, at the third mobile device, whether to transmit a second CTS signal to the fourth mobile device based on a predetermined function of the second received RTS power level and the third received RTS power level,
wherein the predetermined function compares the ratio of the second received RTS power level and the third received RTS power level to a predetermined threshold.

47. An apparatus for increasing system throughput in an unlicensed spectrum comprising:
means for receiving a service set identifier (SSID) broadcast;
means for estimating a channel gain between a first mobile device and a second mobile device based on the SSID broadcast;
means for transmitting from the first mobile device to the second mobile device a first request to send (RTS) signal having a first transmit data power level based on the channel gain between the first mobile device and the second mobile device, wherein the channel gain is inversely proportional to a distance between the first mobile device and the second mobile device;
means for receiving, at the first mobile device, a first clear to send (CTS) signal from the second mobile device;
means for transmitting data at the first transmit data power level from the first mobile device to the second mobile device;
means for receiving, at a third mobile device, the first RTS signal from the first mobile device having a second received RTS power level;
means for receiving, at the third mobile device, a second RTS signal from a fourth mobile device having a third received RTS power level; and
means for determining, at the third mobile device, whether to transmit a second CTS signal to the fourth mobile device based on a predetermined function of the second received RTS power level and the third received RTS power level, wherein the predetermined function compares the ratio of the second received RTS power level and the third received RTS power level to a predetermined threshold.

48. A non-transitory machine readable medium comprising:
- instructions for receiving a service set identifier (SSID) broadcast;
- instructions for estimating a channel gain between a first mobile device and a second mobile device based on the SSID broadcast;
- instructions for transmitting from the first mobile device to the second mobile device a first request to send (RTS) signal having a first transmit data power level based on the channel gain between the first mobile device and the second mobile device, wherein the channel gain is inversely proportional to a distance between the first mobile device and the second mobile device;
- instructions for receiving, at the first mobile device, a first clear to send (CTS) signal from the second mobile device;
- instructions for transmitting data at the first transmit data power level from the first mobile device to the second mobile device;
- instructions for receiving, at a third mobile device, the first RTS signal from the first mobile device having a second received RTS power level;
- instructions for receiving, at the third mobile device, a second RTS signal from a fourth mobile device having a third received RTS power level; and
- instructions for determining, at the third mobile device, whether to transmit a second CTS signal to the fourth mobile device based on a predetermined function of the second received RTS power level and the third received RTS power level, wherein the predetermined function compares the ratio of the second received RTS power level and the third received RTS power level to a predetermined threshold.

* * * * *